United States Patent
Janardhanan et al.

(10) Patent No.: US 9,374,631 B2
(45) Date of Patent: Jun. 21, 2016

(54) DISSIMILAR SWITCH STACKING SYSTEM

(71) Applicant: Dell Products L.P., Round Rock, TX (US)

(72) Inventors: Pathangi Narasimhan Janardhanan, Tamilnadu (IN); Balaji Venkat Venkataswami, TamilNadu (IN)

(73) Assignee: Dell Products L.P., Round Rock, TX (US)

( * ) Notice: Subject to any disclaimer, the term of this patent is extended or adjusted under 35 U.S.C. 154(b) by 584 days.

(21) Appl. No.: 13/912,004

(22) Filed: Jun. 6, 2013

(65) Prior Publication Data
US 2014/0362852 A1     Dec. 11, 2014

(51) Int. Cl.
*H04L 12/50* (2006.01)
*H04Q 3/64* (2006.01)

(52) U.S. Cl.
CPC . *H04Q 3/645* (2013.01); *H04Q 3/64* (2013.01)

(58) Field of Classification Search
None
See application file for complete search history.

(56) References Cited

U.S. PATENT DOCUMENTS

| 8,473,590 B2* | 6/2013 | Holmes | H04L 29/1232 370/254 |
| 2007/0220301 A1* | 9/2007 | Brundridge | G06F 11/2028 714/4.1 |
| 2011/0085560 A1* | 4/2011 | Chawla | H04L 45/586 370/401 |

* cited by examiner

*Primary Examiner* — Duc C Ho
(74) *Attorney, Agent, or Firm* — Haynes and Boone, LLP

(57) ABSTRACT

A switch IHS stacking system includes a plurality of switch IHSs. A least one first switch IHS includes a first processing system and at least one second switch IHS includes a second processing system that is different from the first processing system. A stacking engine is located on each of the plurality of switch IHSs. Following the coupling of the plurality of switch IHSs into a stack and in response to the startup of the plurality of switch IHSs, the each of the stacking engines may exchange capability information with each of the plurality of switch IHSs and determine a control plane processing system affinity and a data plane processing system affinity for each of the plurality of switch IHSs. The stacking engines may then determine a master switch IHS for the stack that has the highest control plane processing system affinity and data plane processing system affinity.

20 Claims, 5 Drawing Sheets

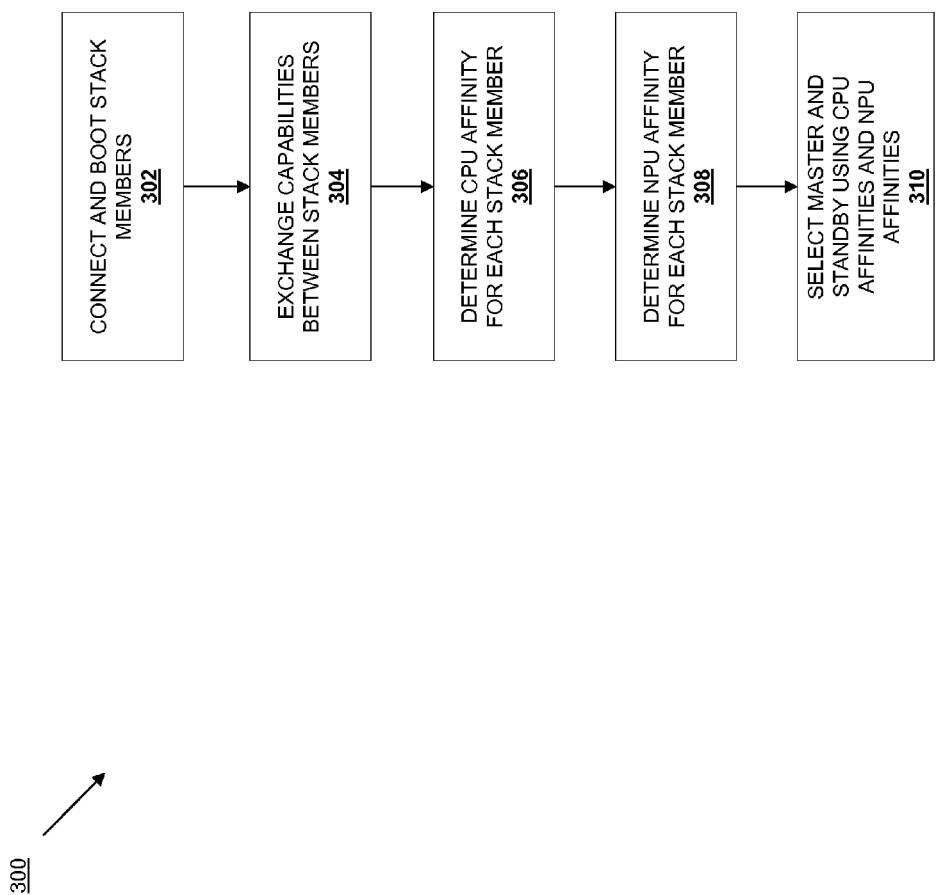

_US 9,374,631 B2_

DISSIMILAR SWITCH STACKING SYSTEM

BACKGROUND

The present disclosure relates generally to information handling systems, and more particularly to stacking dissimilar switch information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs such as, for example, switch IHSs, may be "stacked" with one or more other switch IHSs such that the plurality of switch IHSs operate together like a single switch IHS but have a port capacity equal to the sum of the combined switch IHSs. A stacked switch IHS system including a plurality of the switch IHSs may use a single Internet Protocol (IP) address for administration of the stacked switch IHS system, rather than a separate IP address for each switch IHS in the stacked switch IHS system. However, the conventional stacking of switch IHSs requires that each of the switch IHSs in the stack be a switch from the same platform, as switch IHSs from dissimilar platforms may run on different images, use different central processing units (CPUs), and use different network processing unit (NPU) Application Specific Integrated Circuits (ASICs). For example, processors used by switch IHSs from dissimilar platforms may use CPUs that differ in endianness (e.g., a first platform switch IHS may utilize an Intel® little-endian CPU while a second platform switch IHS may utilize a PowerPC® big-endian CPU). In another example, the NPU ASIC for a first platform switch IHS may operate using larger table sizes than the NPU ASIC for a second platform switch IHS, while the CPU for the second platform switch IHS may have stronger computing capabilities than the CPU for the first switch IHS. Such asymmetries between the platform details of switch IHSs complicates the stacking of dissimilar switch IHSs.

Accordingly, it would be desirable to provide an improved stacking system for stacking dissimilar switch IHSs.

SUMMARY

According to one embodiment, a switch information handling system (IHS) stacking system includes a plurality of switch IHSs including at least one first platform switch IHS having first platform processing system and at least one second platform switch IHS having second platform processing system that is different from the first platform processing system; and a stacking engine located on each of the plurality of switch IHSs, wherein the stacking engine is operable, following the coupling of the plurality of switch IHSs into a stack and in response to the startup of the plurality of switch IHSs, to: exchange capability information with each of the plurality of switch IHSs; determine a control plane processing system affinity for each of the plurality of switch IHSs; determine a data plane processing system affinity for each of the plurality of switch IHSs; and determine a master switch IHS for the stack from the plurality of switch IHSs based on the master switch IHS having the highest control plane processing system affinity and data plane processing system affinity.

BRIEF DESCRIPTION OF THE DRAWINGS

FIG. 3 is a flow chart illustrating an embodiment of a method for stacking switch IHSs.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
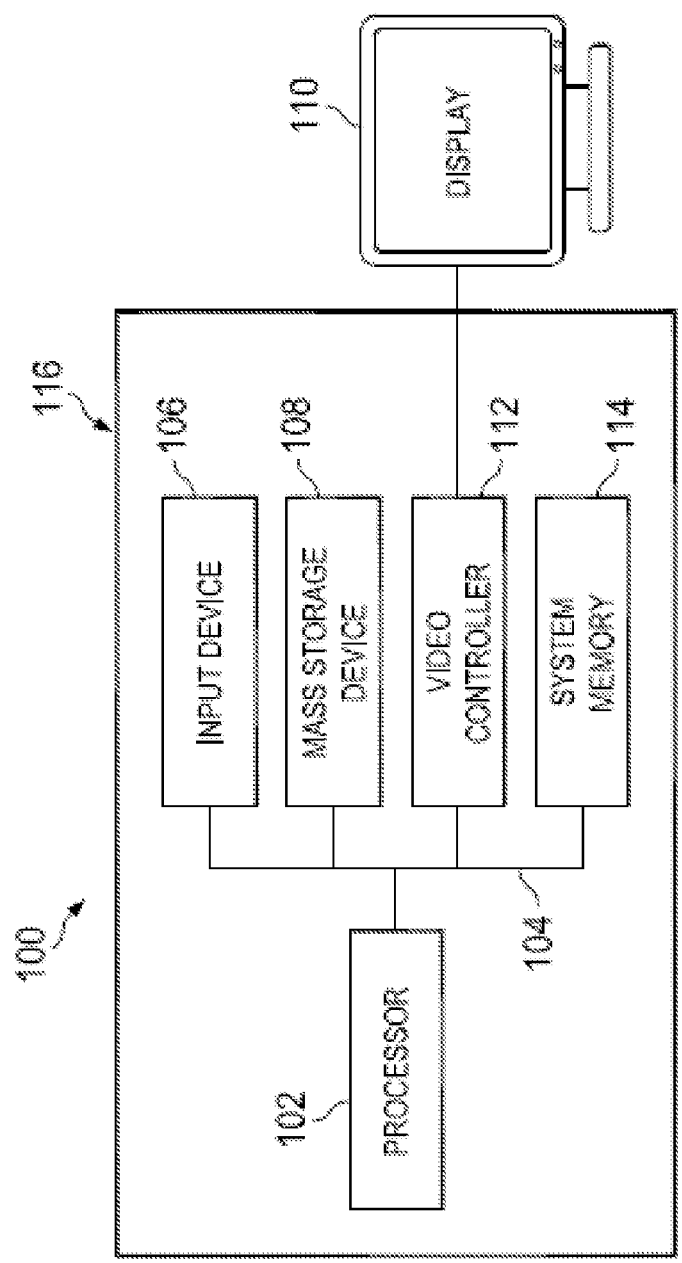
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
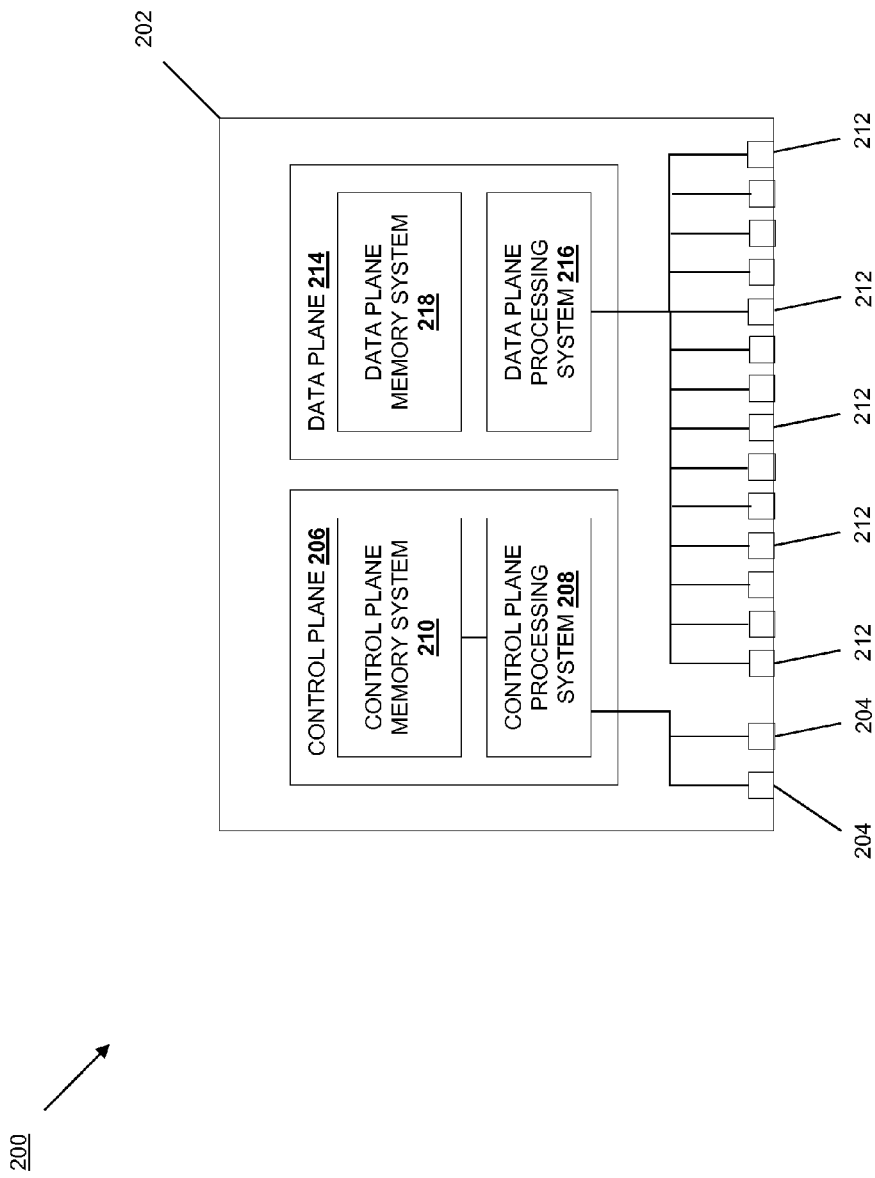
FIG. 2 is a schematic view illustrating an embodiment of a switch IHS.

Referring now to FIG. 2, an embodiment of a switch information handling system (IHS) 200 is illustrated. In an embodiment, the switch IHS 200 may be the IHS 100 discussed above with reference to FIG. 1, or includes some or all of the components of the IHS 100. The switch IHS 200 includes an IHS chassis 202 that houses the components of the switch IHS 200. The switch IHS 200 includes a plurality of stacking/control ports 204 that are coupled to a control plane 206 that includes a control plane processing system 208 that is coupled to a control plane memory system 210. The control plane memory system 210 includes instructions that, when executed by the control plane processing system 208, cause the control plane processing system 208 to perform the control plane functions discussed below that include central processing unit (CPU) functions for the switch IHS 200, as well as control plane functions not discussed herein but known in the art. In an embodiment, the control plane processing system 208 includes a CPU that is housed in the IHS chassis 202. The switch IHS 200 also includes a plurality of traffic ports 212 that are coupled to a data plane 214 that includes a data plane processing system 216 that is coupled to a data plane memory system 218. The data plane memory system 218 includes instructions that, when executed by the data plane processing system 216, cause the data plane processing system 216 to perform the data plane functions discussed below that include network processing unit (NPU) functions for the switch IHS 200, as well as data plane functions not discussed herein but known in the art. In an embodiment, the data plane processing system 216 includes a network processing unit (NPU) Application Specific Integrated Circuit (ASIC) that is housed in the IHS chassis 202.

The IHS chassis 202 may house other switch IHS components known in the art, but those other switch IHS components are not illustrated in FIG. 2 for clarity of discussion and illustration. Furthermore, switch IHS components illustrated in FIG. 2 may be combined. For example, the control plane memory system 210 and the data plane memory system 218 may each be part of the same memory system that is housed in the IHS chassis 202. While the illustrated embodiment includes dedicated stacking ports and traffic ports, one of skill in the art will recognize that the switch IHS 200 may be configured to allow stacking using any ports on the switch IHS 200 and to transmit traffic using any other ports on the switch IHS 200.

Referring now to FIGS. 3 and 4, an embodiment of a method 300 for stacking switch IHSs is illustrated. As discussed above, switch IHSs such as the switch IHS 200 illustrated in FIG. 2 are typically designed and manufactured as part of a platform that provides those switch IHSs with similar control plane processing systems and data plane processing systems. However, across platforms, control plane processing systems and/or data plane processing systems in switch IHSs differ greatly in structure and function. The present disclosure provides switch IHSs and stacking methods that allow a user to combine or "stack" switch IHSs from different platforms and manage those switch IHSs as a single unit. Thus, switch IHSs from different platforms that run on different images, use different CPUs, and use different NPU ASICs may be stacked such that those switch IHSs operate together while showing the characteristics of a single switch, but having a port capacity equal to the sum of the combined switch IHSs.

An example of a switch IHS from a first platform is a Dell Force10 S4810 High Performance 10/40 GbE Switch, while an example of a switch IHS from a second platform is a Dell Force10 S4820T 10/40 GbE blade switch or a Dell Force10 Z9000 Series 10/40 GbE high density switch. However, switch IHSs from any variety of different platforms known in the art will benefit from the teachings of the present disclosure.

The method 300 begins at block 302 where stack members are connected and booted. FIG. 4 illustrates an embodiment of a stacked switch IHS system 400 that includes a plurality of switch IHSs 402, 404, 406, 408, 410, and 412. Each of the switch IHSs 402, 404, 406, 408, 410, and 412 may be substantially similar to the switch IHS 200, discussed above with reference to FIG. 2. However the details of the control plane processing system 208 and/or data plane processing system 216 may differ across the switch IHSs 402, 404, 406, 408, 410, and 412 because at least some of those switch IHSs may be from different platforms, as discussed above.

In the illustrated embodiment, each of the switch IHSs 402, 404, 406, 408, 410, and 412 includes a pair of stacking ports located on the left side of that switch IHS (e.g., similar to the stacking ports 402a on the switch IHS 402), and forty traffic ports to the right of the stacking ports (e.g., similar to the traffic ports 402b on the switch IHS 402.) In the stacked switch IHS system 400, the switch IHSs 402, 404, 406, 408, 410, and 412 are stacked using links 414 to connect stacking ports across the switch IHSs 402, 404, 406, 408, 410, and 412. FIG. 4b illustrates a schematic view of the stacked switch IHS system 400 that includes the switch IHSs IHS 402, 404, 406, 408, 410, and 412 coupled together as discussed with reference to FIG. 4a. Each of the switch IHSs IHS 402, 404, 406, 408, 410, and 412 includes a respective stacking engine 402a, 404a, 406a, 408a, 410a, and 412a, and each stacking engine 402a, 404a, 406a, 408a, 410a, and 412a is coupled to the other stacking engines via the links 414. Each stacking engine may be provided by instructions on a memory system in the switch IHS that, when executed by the processing system (e.g., a CPU), cause the processing system to provide the functions of the stacking engine, discussed below.

In an embodiment, the switch IHSs 402, 404, 406, 408, 410, and 412 are stacked in a bi-directional loop to provide redundancy in the stack connection. In an embodiment, the connection of the stacking ports using the links 414 provides a switching backplane across the switch IHSs 402, 404, 406, 408, 410, and 412 and carries control traffic between the switch IHSs 402, 404, 406, 408, 410, and 412. While a specific stacking configuration for six switch IHSs is described and illustrated herein, one of skill in the art will recognize that different stacking configurations and varying numbers of stacked switch IHSs will fall within the scope of the present disclosure.

Figure 4A:
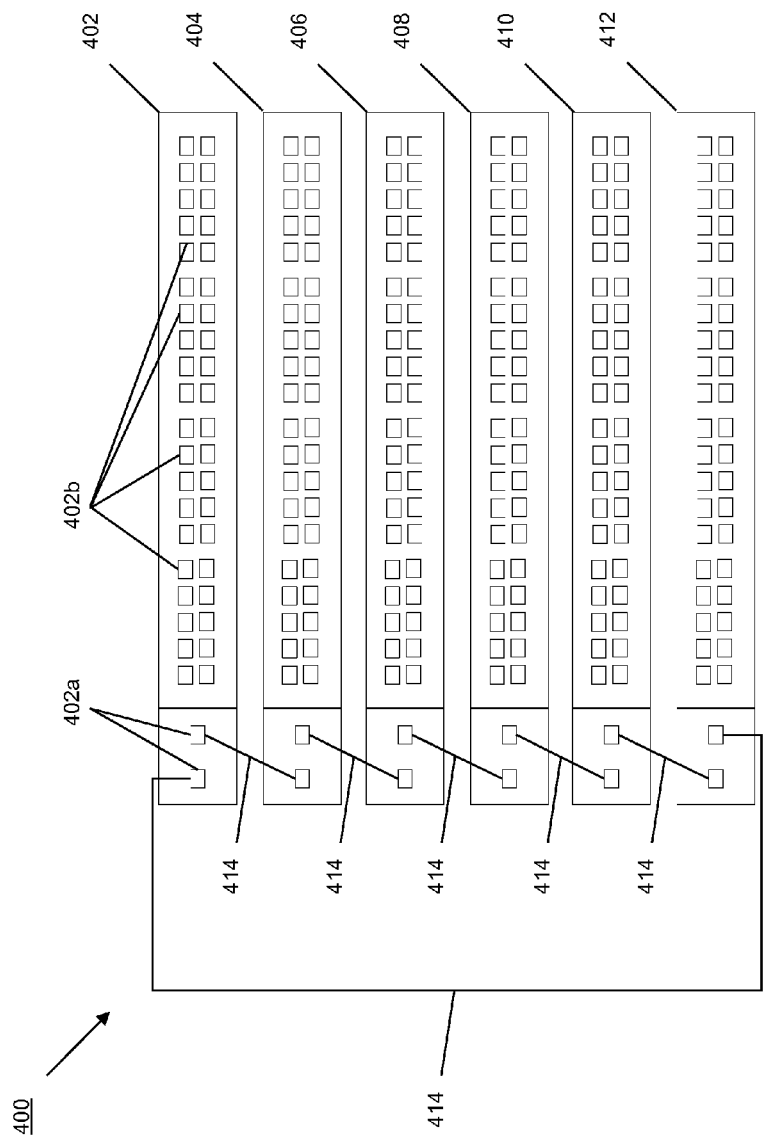
FIG. 4*a* is a front view illustrating an embodiment of a stack of switch IHSs.
Figure 4B:
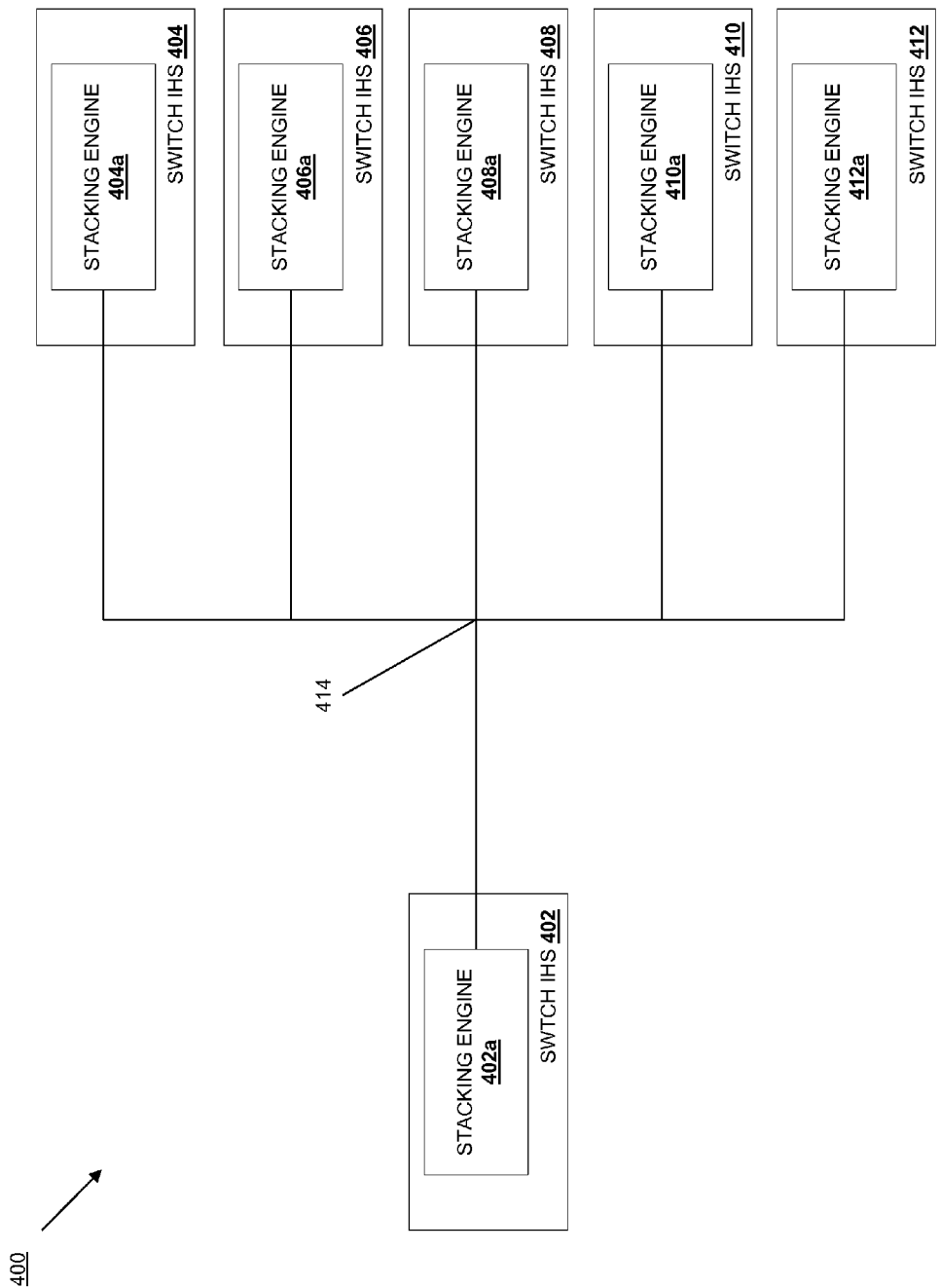
FIG. 4*b* is a schematic view illustrating an embodiment of a stack of switch IHSs.

As discussed above, connecting the switch IHSs 402, 404, 406, 408, 410, and 412 as disclosed in FIGS. 4a and 4b provides a stacked switch IHS system 400 that appears to a user as a single switch IHS, operates using one Internet Protocol (IP) address that may be utilized by the user to manage and configure any of the switch IHSs in the stacked switch IHS system 400. For example, each switch IHS in the stacked switch IHS system 400 may be identified by its Media Access Control (MAC) address, which may be used internally during a discovery process to identify and operate on individual switch IHSs, and a stack unit number that is assigned to each switch IHS by the master switch IHS (discussed below) after the discovery process is complete to identify the switch IHSs to the user and for identifying ports in the stacked switch IHS system 400. As discussed in further detail below, the switch IHSs operate during the method 300 to elect a master switch IHS that will manage the stacked switch IHS system 400. That master switch IHS will then be responsible for configuring the other switch IHSs in the stacked switch IHS system 400 using a configuration file in the master switch IHS, ensuring that each switch IHS has a consistent startup/saved configuration file, ensure that switching tables are consistent across switch IHSs in the stacked switch IHS system 400, and running higher level protocols such as, for example, the Spanning Tree Protocol, layer 3 (L3) protocols such as the Open Shortest Path First protocol, and/or a variety of other higher level protocols known in the art. Each switch IHS 402, 404, 406, 408, 410, and 412 will be capable of becoming the master switch IHS and is operable to take over as the master switch IHS if the current master switch IHS fails.

After the connection of the stack members (e.g., into the stacked switch IHS system 400), each of the stack members may be powered on, started up, booted, and/or otherwise initiated. Following booting, each switch IHS may be initialized using methods known in the art. Following initialization, each switch IHS may conduct stack discovery, using methods known in the art, in order to discover each of the other switch IHSs in the stacked switch IHS system 400.

The method 300 then proceeds to block 304 where capabilities are exchanged between stack members. Blocks 304, 306, 308, and 310 of the method 300 are described below with specific reference to the switch IHS 402 and its stacking engine 402a. However, each of the switch IHSs 404, 406, 408, 410, and 412 and their stacking engines 404a, 406a, 408a, 410a, and 412a may perform the blocks 304, 306, 308, and 310 substantially similarly as discussed for the IHS 402 and its stacking engine 402a below. At block 304, the stacking engine 402a in the switch IHS 402 exchanges capability information with each of the stacking engines 404a, 406a, 408a, 410a, and 412a in the respective switch IHSs switch IHSs 404, 406, 408, 410, and 412. For example, capability information for the switch IHSs 402 may be determined by the stacking engine 402a and sent to each of the other stacking engines 404a, 406a, 408a, 410a, and 412a in the switch IHSs 404, 406, 408, 410, and 412. Similarly, the stacking engines in each of the switch IHSs may determine their own capability information and send that capability information to the other stacking engines. In an embodiment, capability information may be exchanged between stacking engines using type-length-value (TLV) elements sent through the stacking ports and over the links 414.

As discussed in further detail below, capability information allows for the election of a master switch IHS based on various switch IHS platform capability factors and features. In an embodiment, capability information may include a control plane processing system affinity (e.g., a CPU affinity) that indicates how capable the control plane processing system in a switch IHS is. For example, the control plane processing system affinity may be a number between 1 and 16 that is calculated based on factors associated with the control plane processing system that may include a CPU type (CPU_TYPE), CPU number of cores (CPU_NUMCORES), a number of CPUs (CPU_NUMCPU), how many cores in the CPU software runs on (CPU_SWRUN_CORES), CPU endianness (CPU_ENDIANNESS), CPU clock speed (CPU_CLOCK_SPEED, CPU cache size (CPU_CACHE_SIZE), the access speed and size of persistent storage for the CPU (PERSISTENT_STORAGE), whether software uses multiple CPUs (SW_USES_MULTIPLE_CPU), whether software uses multiple cores (SW_USES_MULTIPLE_CORES), memory size (MEMORY_SIZE), memory type (MEMORY_TYPE), and the spot in the network (SPOT_IN_THE_NETWORK). The control plane processing system affinity for each switch IHS that supports stacking with other switch IHSs of dissimilar platforms may be configured manually and provided on that switch IHS, or may be determined dynamically by that switch IHS.

In one example, an equation for calculating the control plane processing system affinity may include any of the factors listed above, each multiplied by a coefficient, such as:

CALC_SUM=(K1*CPU_TYPE)+(K2*CPU_NUMCORES)+(K3*NUMCPU)+(K4*CPUSWRUN_CORES)+(K5*CPU_ENDIANNESS)+(K6*CPU_CLOCK_SPEED)+(K7*CPU_CACHE_SIZE)+(K8*PERSISTENT_STORAGE)+(K9*SW_USES_MULTIPLE_CPU)+(K10*SW_USES_MULTIPLE_CORES)+(K11*MEMORY_SIZE)+(K12*MEMORY_TYPE)+(K13*USER_BIAS_CONFIGURED)

One of skill in the art will recognize that a suitable ranking or value may be determined and provided for each of the factors provided above such that CALC_SUM provides a numeric value that may be used as discussed below. For example, rankings or values for factors may be tabulated uniformly for all systems sold by a vendor. The control plane processing system affinity may be calculated by:

CPU_AFFINITY=(CALC_SUM/100)*16

In an embodiment, the USER_BIAS_CONFIGURED allows a user to provide a value that will influence the control plane processing system affinity calculation. The control plane processing system affinity value may be capped at 16 (i.e., any value over 16 will simply be provided as 16), and the coefficients K1, K2, . . . and up to K13 may be selected such that CALC_SUM is between 1 and 100.

In an embodiment, capability information may include a data plane processing system affinity (e.g., a NPU affinity) that indicates how capable the data plane processing system in a switch IHS is. For example, the data plane processing system affinity may be a number between 1 and 16 that is calculated based on factors associated with the data plane processing system that may include a NPU type (NPU_TYPE), NPU number of ports (NPU_NUM_PORTS), a total bandwidth of the NPU (NPU_TOT_BW), a number of port pipes for the NPU (NUM_PORT_PIPES), NPU table size (NPU_F(1 . . . N)_TABLE_SIZE), and a platform feature support (PLATFORM_(1 . . . N)_FEATURE_SUPPORT). The data plane processing system affinity for each switch IHS that supports stacking with other switch IHSs of dissimilar platforms may be configured manually and provided on that switch IHS, or may be determined dynamically by that switch IHS.

In one example, an equation for calculating the data plane processing system affinity may include any of the factors listed above, each multiplied by a coefficient, such as:

CALC_SUM=(K1*NPU_TYPE)+(K2*NPU_NUM_PORTS)+(K3*NPU_TOT_BW)+(K4*NUM_PORT_PIPES)+(K5*NPU_F(1 . . . N)_TABLE_SIZE)+(K6*PLATFORM_(1 . . . N)_FEATURE_SUPPORT)+(K7*USER_BIAS_CONFIGURED)

One of skill in the art will recognize that a suitable ranking or value may be determined and provided for each of the factors provided above such that CALC_SUM provides a numeric value that may be used as discussed below. For example, rankings or values for factors may be tabulated uniformly for all systems sold by a vendor. The data plane processing system affinity may be calculated by:

NPU_AFFINITY=(CALC_SUM/100)*16

In an embodiment, the USER_BIAS_CONFIGURED allows a user to provide a value that will influence the data plane processing system affinity calculation. The data plane processing system affinity value may be capped at 16 (i.e., any value over 16 will simply be provided as 16), and the coefficients K1, K2, . . . and up to K7 may be selected such that CALC_SUM is between 1 and 100.

Thus, at block 304 of the method 300, the stacking engine 402a in the switch IHS 402 may determine capability information that includes a control plane processing system affinity and a data plane processing system affinity for the switch IHS 402, and provide that capability information in a capability exchange TLV to each of the stacking engines 404a, 406a, 408a, 410a, and 412a in the switch IHSs 404, 406, 408, 410, and 412. In addition, at block 304, the stacking engine 402a in the switch IHS 402 may receive capability exchange TLVs from each of the stacking engines 404a, 406a, 408a, 410a, and 412a in the switch IHSs 404, 406, 408, 410, and 412 that include the capability information (e.g., control plane processing system affinity and data plane processing system affinity) for each of those switch IHSs 404, 406, 408, 410, and 412. Likewise, each of the stacking engines 404a, 406a, 408a, 410a, and 412a in the switch IHSs 404, 406, 408, 410, and 412 will send capability information (e.g., control plane processing system affinity and data plane processing system affinity) to and receive capability information from each of the other switch IHSs. In other embodiments, the exchange of capability information at block 304 may include the exchange of factors discussed above, and the stacking engine in each switch IHS may then calculate the control plane processing system affinity and data plane processing system affinity for each of the other switch IHSs at blocks 306 and 308 below.

The method 300 then proceeds to blocks 306 and 308 where a control plane processing system affinity (e.g., CPU affinity) and a data plane processing system affinity (e.g., NPU affinity) is determined for each stack member. For example, the stacking engine 402a in the switch IHS 402 may determine the control plane processing system affinity and data plane processing system affinity for each switch IHS in the stacked switch IHS system 400 (including itself) by retrieving that information from the capability exchange TLVs sent and received at block 304. In another embodiment, the stacking engine 402a in the switch IHS 402 may use the factors received in the capability exchange TLVs at block 304 to calculate the control plane processing system affinity and data plane processing system affinity for each switch IHS in the stacked switch IHS system 400 (including itself.) Likewise, each stacking engine 404a, 406a, 408a, 410a, and 412a in the switch IHSs 404, 406, 408, 410, and 412 may each determine the control plane processing system affinity and data plane processing system affinity for each other switch IHS in the stacked switch IHS system 400 as well as for itself in a similar manner.

The method 300 then proceeds to block 310 where a master switch IHS and a standby switch IHS are selected using the control plane processing system affinities (e.g., CPU affinities) and data plane processing system affinities (e.g., NPU affinities). Following block 308, the stacking engine 402a in the switch IHS 402 has control plane processing system affinities and data plane processing system affinities for each of the switch IHSs 402, 404, 406, 408, 410, and 412 in the stacked switch IHS system 400. Likewise, each stacking engine 404a, 406a, 408a, 410a, and 412a in the switch IHSs 404, 406, 408, 410, and 412 has those same control plane processing system affinities and data plane processing system affinities for each of the switch IHSs 402, 404, 406, 408, 410, and 412 in the stacked switch IHS system 400. Thus, at block 310, each of the stacking engine 402a, 404a, 406a, 408a, 410a, and 412a in the switch IHSs 402, 404, 406, 408, 410, and 412 may use the control plane processing system affinities and data plane processing system affinities to select the same master switch IHS and standby switch IHS from the switch IHSs 402, 404, 406, 408, 410, and 412 in the stacked switch IHS system 400.

Master selection at block 310 is biased towards selection of the switch IHS with the most capable control plane processing system (e.g., CPU) and memory. The control plane processing system affinities allow each stacking engine to determine a subset of the switch IHSs in stacked switch IHS system 400 that have the most capable control plane processing systems. In some situations, the control plane processing system affinities will indicate that a single switch IHS in the stacked switch IHS system 400 has the most capable control plane processing system, and that switch IHS will be selected as the master switch IHS for the stacked switch IHS system 400 by each of the stacking engines 402a, 404a, 406a, 408a, 410a, and 412a in the switch IHSs 402, 404, 406, 408, 410, and 412.

However, in some situations, the control plane processing system affinities will indicate that a plurality of the switch IHSs in the stacked switch IHS system 400 have equally capable (or each capable within a predetermined range) control plane processing systems. In those situations, the data plane processing system affinities allow each stacking engine to determine which of those plurality of switch IHSs in stacked switch IHS system 400 have the most capable data plane processing systems. In some situations, the data plane processing system affinities will indicate that a single switch IHS of the plurality of equal capability control plane processing system switch IHSs in the stacked switch IHS system 400 has the most capable data plane processing system, and that switch IHS will be selected as the master switch IHS for the stacked switch IHS system 400 by each of the stacking engines 402a, 404a, 406a, 408a, 410a, and 412a in the switch IHSs 402, 404, 406, 408, 410, and 412. However, in some situations, the data plane processing system affinities will indicate that more than one of the plurality of equal capability control plane processing system switch IHSs in the stacked switch IHS system 400 have equally capable (or each capable within a predetermined range) control plane processing systems and data plane processing systems. In those situations, the master switch IHS may be selected based on other factors such as, for example, power consumption (a switch IHS that consumes less power may be more desirable as the master switch IHS, and/or a priority value configured for stacking on each stacking unit, along with the Bridge MAC address of each switch, may be used to determine or "tie-break" the IHS systems with equally capable control plane processing systems and data plane processing systems.

Similarly, one or more standby switch IHSs, which is a switch IHS in the stacked switch IHS system 400 that may take over for the master switch IHS in the event of a failure, may be selected using the control plane processing system affinities and data plane processing affinities. For example, the comparison of the control plane processing system affinities may indicate that a first switch IHS in the stacked switch IHS system 400 has the most capable control plane processing system and a second switch IHS in the stacked switch IHS system 400 has the second most capable control plane processing system, and that second switch IHS will then be selected as the standby switch IHS for the stacked switch IHS system 400 by each of the stacking engines 402a, 404a, 406a, 408a, 410a, and 412a in the switch IHSs 402, 404, 406, 408, 410, and 412. In another example, the control plane processing system affinities will indicate that a plurality of the switch IHSs in the stacked switch IHS system 400 have equally capable (or each capable within a predetermined range) control plane processing systems, and the data plane processing system affinities will indicate that a first switch IHS in the stacked switch IHS system 400 has the most capable data plane processing system while a second switch IHS in the stacked switch IHS system 400 has the second most capable data plane processing system. The second switch IHS may then be selected as the standby switch IHS for the stacked switch IHS system 400 by each of the stacking engines 402a, 404a, 406a, 408a, 410a, and 412a in the switch IHSs 402, 404, 406, 408, 410, and 412. However, in some situations, the data plane processing system affinities will indicate that a plurality of the switch IHSs in the stacked switch IHS system 400 have equally capable (or each capable within a predetermined range) control plane processing systems and data plane processing systems. In those situations, the standby switch IHS may be selected using a priority value configured for stacking on each stacking unit, along with the Bridge MAC address of each switch. In an embodiment, a switch IHS may be a dual route processing module (RPM) switch IHS that includes two RPMs, and the master switch IHS may be selected as the standby switch IHS as well such that if one of the RPMs in the dual RPM switch IHS fails, the other of the RPMs in the dual RPM switch IHS may take over in the master switch IHS.

Once elected, the master switch IHS will manage the stacked switch IHS system 400 and perform operations such as, for example, configuring each of the switch IHSs in the stacked switch IHS system 400 (e.g., based on a configuration file), ensuring that each of the switch IHSs in the stacked switch IHS system 400 have consistent startup/saved configuration files, ensuring that switching tables for each of the switch IHSs in the stacked switch IHS system 400 are consistent across the stacked switch IHS system 400, and running all higher level protocols like the spanning tree algorithm, open shortest path first, etc.

In an embodiment, after being selected as the master switch IHS, the master switch IHS may enable features sets in each of the switch IHSs in the stacked switch IHS system 400. Feature sets for a switch IHS may be included in the capability information exchanged at block 304 of the method 300 (e.g., in the capability exchange TLVs). For example, the master switch IHS may determine a minimum common feature set that is common to each of the switch IHSs in the stacked switch IHS system 400, and that minimum common feature set will be enabled on each of the switch IHSs (i.e., features not available on all of the switch IHSs in the stacked switch IHS system 400 may be disabled on switch IHSs that provide them.) However, in some situations, rather than limiting the operation of the stacked switch IHS system 400 to a minimum common feature set provided by each of the switch IHSs, the master switch IHS may instead enable full features sets provided by each switch IHS, and then when a packet is received by a switch in the stacked switch IHS system 400 that requires a feature not supported by the switch IHS, the stacking engine in that switch IHS may forward that packet to a switch IHS in the stacked switch IHS system 400 that does support that feature.

In another example, a switch IHS may be added to the stacked switch IHS system 400 that has a plurality of switch IHSs each operating with the minimum common feature set. If the master switch IHS determines that the added switch IHS provides that minimum common feature set, the master switch IHS may add the added switch IHS to the stacked switch IHS system 400 (and, if necessary, disable features not included in the minimum common feature set.) If the added switch IHS has provides more features than the minimum common feature set being provided by the switch IHSs currently in the stacked switch IHS system 400, the master switch IHS may also be excluded or isolated from the stacked switch IHS system 400 and provided as stand-alone units.

In an embodiment, after being selected as the master switch IHS, the master switch IHS may set the data plane processing system tables sizes in each of the switch IHSs in the stacked switch IHS system 400. For example, the master switch IHS may determine a lowest table size used by the data plane processing systems in each of the switch IHSs in the stacked switch IHS system 400, and set a table size in each of the switch IHSs in the stacked switch IHS system 400 to that lowest table size.

Thus, systems and methods have been described that provide for the stacking of a plurality of switch IHSs from different platforms. The stacking of dissimilar platform switch IHSs is accomplished by the exchange of capability information between the switch IHSs such that a master switch IHS can be selected for the stacked switch IHS system based on that master switch IHS having the most capable CPU, memory system, and in some cases NPU. Similarly, the exchange of capability information between the switch IHSs allows a standby switch IHS to be selected for the stacked switch IHS system based on that standby switch IHS having the second most capable CPU, memory system, and in some cases NPU. Once selected, the master switch IHS can configured the switch IHSs from dissimilar platforms to operate together by enabling common feature sets, setting table sizes, and otherwise configuring each of the switch IHSs such that those switch IHSs may operate together.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A switch information handling system (IHS) stacking system, comprising:
    a plurality of switch IHSs including at least one first platform switch IHS having first platform processing system and at least one second platform switch IHS having second platform processing system that is different from the first platform processing system; and
    a stacking engine located on each of the plurality of switch IHSs, wherein the stacking engine is operable, following the coupling of the plurality of switch IHSs into a stack and in response to the startup of the plurality of switch IHSs, to:
        exchange capability information with each of the plurality of switch IHSs;
        determine a control plane processing system affinity for each of the plurality of switch IHSs;
        determine a data plane processing system affinity for each of the plurality of switch IHSs; and
        determine a master switch IHS for the stack from the plurality of switch IHSs based on the master switch IHS having the highest control plane processing system affinity and data plane processing system affinity.

2. The system of claim 1, wherein the stacking engine is further operable to:

determine a standby switch IHS for the stack from the plurality of switch IHSs based on the standby switch IHS having the second highest control plane processing system affinity and data plane processing system affinity.

3. The system of claim 1, wherein the master switch IHS is operable to:
determine a lowest table size used by a plurality of data plane processing systems in the plurality of switch IHSs; and
set a table size for each of the plurality of data plane processing systems to the lowest table size.

4. The system of claim 1, wherein the master switch IHS is operable to:
determine a minimum common feature set supported by each of the plurality of switch IHSs; and
set a feature set for each of the plurality of switch IHSs to the minimum common feature set.

5. The system of claim 4, wherein the master switch IHS is further operable to:
turn off features in each of the plurality of switch IHSs that are not included in the minimum common feature set.

6. The system of claim 1, wherein the master switch IHS is operable to:
determine that at least one of the plurality of switch IHSs does not support a feature; and
exclude the at least one of the plurality of switch IHSs does not support the feature from the stack.

7. The system of claim 1, wherein each switch IHS in the stack is operable to:
determine that a packet has been received for which a feature is needed that is not supported; and
forward the packet to one of the plurality of switch IHSs that supports the feature.

8. An switch information handling system (IHS), comprising:
a plurality of ports;
a first processing system coupled to at least some of the plurality of ports; and
a stacking engine that is operable, following connection to a stack including a plurality of switch IHSs, at least one having a second processing system that is different from the first processing system, to:
exchange capability information with each of the plurality of switch IHSs;
determine a control plane processing system affinity for each of the plurality of switch IHSs;
determine a data plane processing system affinity for each of the plurality of switch IHSs; and
determine a master switch IHS for the stack based on the master switch IHS having the highest control plane processing system affinity and data plane processing system affinity.

9. The switch IHS of claim 8, wherein the stacking engine is further operable to:
determine a standby switch IHS for the stack based on the standby switch IHS having the highest control plane processing system affinity and data plane processing system affinity.

10. The switch IHS of claim 8, wherein the master switch IHS is operable to:
determine a lowest table size used by a plurality of data plane processing systems in the plurality of switch IHSs; and
set a table size for each of the plurality of data plane processing systems to the lowest table size.

11. The switch IHS of claim 8, wherein the master switch IHS is operable to:
determine a minimum common feature set supported by each of the plurality of switch IHSs; and
set a feature set for each of the plurality of switch IHSs to the minimum common feature set.

12. The switch IHS of claim 11, wherein the master switch IHS is further operable to:
turn off features in each of the plurality of switch IHSs that are not included in the minimum common feature set.

13. The switch IHS of claim 8, wherein the master switch IHS is operable to:
determine that at least one of the plurality of switch IHSs does not support a feature; and
exclude the at least one of the plurality of switch IHSs does not support the feature from the stack.

14. The switch IHS of claim 8, wherein the data plane processing system is operable to:
determine that a packet has been received for which a feature is needed that is not supported; and
forward the packet to one of the plurality of switch IHSs that supports the feature.

15. A method for stacking switch IHSs, comprising:
exchanging, by a first switch IHS, capability information with each of a plurality of switch IHSs, at least one of the plurality of switch IHSs having a different platform processing system than the first switch IHS;
determining a control plane processing system affinity for each of the plurality of switch IHSs;
determining a data plane processing system affinity for each of the plurality of switch IHSs;
determining a master switch IHS for the stack based on the master switch IHS having the highest control plane processing system affinity and data plane processing system affinity.

16. The method of claim 15, further comprising:
determining a standby switch IHS for the stack based on the standby switch IHS having the highest control plane processing system affinity and data plane processing system affinity.

17. The method of claim 15, further comprising:
determining a lowest table size used by a plurality of data plane processing systems in the plurality of switch IHSs; and
setting a table size for each of the plurality of data plane processing systems to the lowest table size.

18. The method of claim 15, further comprising:
determining a minimum common feature set supported by each of the plurality of switch IHSs; and
setting a feature set for each of the plurality of switch IHSs to the minimum common feature set.

19. The method of claim 18, further comprising:
turning off features in each of the plurality of switch IHSs that are not included in the minimum common feature set.

20. The method of claim 15, further comprising:
determining that at least one of the plurality of switch IHSs does not support a feature; and
excluding the at least one of the plurality of switch IHSs does not support the feature from the stack.

* * * * *